US008897257B2

(12) United States Patent
Bachmann et al.

(10) Patent No.: US 8,897,257 B2
(45) Date of Patent: *Nov. 25, 2014

(54) CONTEXT TRANSFER IN A COMMUNICATION NETWORK COMPRISING PLURAL HETEROGENEOUS ACCESS NETWORKS

(75) Inventors: Jens Bachmann, Langen (DE); Alexander Bourgett, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/707,487

(22) Filed: Feb. 17, 2010

(65) Prior Publication Data

US 2010/0142484 A1  Jun. 10, 2010

Related U.S. Application Data

(63) Continuation of application No. 10/579,063, filed as application No. PCT/EP2004/012083 on Oct. 26, 2004, now Pat. No. 7,688,785.

(30) Foreign Application Priority Data

Nov. 12, 2003  (EP) .................................... 03026069

(51) Int. Cl.
*H04W 4/00* (2009.01)
*H04W 8/22* (2009.01)
(Continued)

(52) U.S. Cl.
CPC ............ *H04W 36/0033* (2013.01); *H04W 8/22* (2013.01); *H04W 36/14* (2013.01); *H04W 84/042* (2013.01); *H04W 88/06* (2013.01); *H04W 8/10* (2013.01); *H04L 12/2856* (2013.01); *H04W 84/12* (2013.01); *H04W 92/02* (2013.01)
USPC ............ 370/331; 370/332; 455/436; 455/439

(58) Field of Classification Search
USPC .......................... 370/331, 332; 455/439, 444
See application file for complete search history.

(56) References Cited

U.S. PATENT DOCUMENTS 5,854,981 A * 12/1998 Wallstedt et al. ............. 455/439
6,477,156 B1 * 11/2002 Ala-Laurila et al. .......... 370/331
(Continued)

FOREIGN PATENT DOCUMENTS

JP  2001/8251  1/2001
JP  2002-232930  8/2002
(Continued)

OTHER PUBLICATIONS

European Search Report dated May 6, 2004.
(Continued)

*Primary Examiner* — Allahyar Kasraian
(74) *Attorney, Agent, or Firm* — Dickinson Wright PLLC (57) ABSTRACT

The present invention relates to a method for a context transfer in a communication network including a plurality of heterogeneous access networks, wherein a mobile terminal is attached to one of the access networks. Further, the present invention relates to a context transfer manager performing the method. Moreover, the present invention relates to a mobile terminal specially adapted to perform the provided method for a context transfer. To facilitate a context transfer between heterogeneous access networks, the present invention introduces a context transfer manager generating at least one context based on capabilities and parameters associated to the mobile terminal and capabilities and parameters of the neighboring access networks taking into account the respective access technology. Further the context transfer manager is common to the heterogeneous access networks in the communication network and performs the context transfers related to a particular mobile terminal.

9 Claims, 6 Drawing Sheets

(51) Int. Cl.
*H04L 12/28* (2006.01)
*H04W 36/00* (2009.01)
*H04W 36/14* (2009.01)
*H04W 84/04* (2009.01)
*H04W 88/06* (2009.01)
*H04W 8/10* (2009.01)
*H04W 84/12* (2009.01)
*H04W 92/02* (2009.01)

(56) References Cited

U.S. PATENT DOCUMENTS

| | | | |
|---|---|---|---|
| 6,591,103 | B1 | 7/2003 | Dunn |
| 6,904,029 | B2 * | 6/2005 | Fors et al. ............ 370/331 |
| 7,130,625 | B2 * | 10/2006 | Akgun et al. .......... 455/422.1 |
| 7,356,595 | B2 | 4/2008 | Soininen |
| 7,440,429 | B2 | 10/2008 | Fodor |
| 7,656,840 | B2 * | 2/2010 | Krishnamurthi et al. ..... 370/331 |
| 2002/0059453 | A1 | 5/2002 | Eriksson |
| 2002/0071404 | A1 | 6/2002 | Park |
| 2002/0082015 | A1 * | 6/2002 | Wu .................... 455/436 |
| 2002/0147008 | A1 * | 10/2002 | Kallio ................. 455/426 |
| 2003/0048773 | A1 | 3/2003 | Wu |
| 2003/0087646 | A1 | 5/2003 | Funato |
| 2003/0092444 | A1 | 5/2003 | Sengodan |
| 2003/0103496 | A1 | 6/2003 | Narayanan |
| 2003/0161265 | A1 | 8/2003 | Cao |
| 2003/0174667 | A1 * | 9/2003 | Krishnamurthi et al. ..... 370/328 |
| 2003/0193910 | A1 * | 10/2003 | Shoaib et al. ............ 370/331 |
| 2003/0204599 | A1 | 10/2003 | Trossen |
| 2003/0214922 | A1 | 11/2003 | Shahrier |
| 2004/0092259 | A1 | 5/2004 | Blanc |
| 2004/0233866 | A1 | 11/2004 | Bossoli |
| 2005/0090259 | A1 * | 4/2005 | Jain et al. ............. 455/439 |
| 2005/0107085 | A1 * | 5/2005 | Ozluturk .............. 455/439 |
| 2005/0169228 | A1 * | 8/2005 | Dowling ............... 370/342 |
| 2006/0099952 | A1 | 5/2006 | Prehofer |
| 2011/0003594 | A1 | 1/2011 | Cooper |

FOREIGN PATENT DOCUMENTS

| | | |
|---|---|---|
| JP | 2003-283565 | 10/2003 |
| WO | 02/080607 | 10/2002 |
| WO | 02/087160 | 10/2002 |
| WO | 02/093955 | 11/2002 |
| WO | 03/050976 | 6/2003 |
| WO | 03/079700 | 9/2003 |

OTHER PUBLICATIONS

J. Loughney, et al.: "Context Transfer Protocol," Internet Draft, Sep. 2003, pp. 1-23, Retrieved from the Internet: URL: www.ietf.org.

M. Liebsch, et al.: "Candidate access Router Discovery," Internet Draft, Sep. 2003, pp. 1-18, Retrieved from the Internet: URL: www.ietf.org.

IEEE Draft IEEE 802.11f-D3, "Recommended Practice for Multi-Vendor Access Point; Interoperability via an Inter-Access Point Protocol Across Distribution Systems Supporting IEEE 802.11 Operation," Jan. 2002, pp. 1-44.

H. Haverinen, et al.: "EAP SIM Autentication," IETF Internet Draft, Oct. 2003, pp. 1-69, Retrieved from the Internet: URL: www.ietf.org.

J. Arkko, et al.: "EAP AKA Autentication," IETF Internet Draft, Oct. 2003, pp. 1-58, Retrieved from the Internet: URL: www.ietf.org.

European Search Report dated Nov. 8, 2010.

Japanese Notice of Reasons for Rejection dated Sep. 7, 2010 with English translation.

Notice of the Reason for Rejection dated Sep. 6, 2011 with English Translation, (For Corresponding Japanese Patent Application 2010-111214).

Notice of Reasons for Rejection dated Aug. 6, 2013 with English Translation.

R. Koodli, et al., "Fast Handovers and Context Transfers in Mobile Networks," ccr-200109-koodli, IEEE 802.21, Sep. 11, 2003, 11 pages total.

International Search Report dated Dec. 30, 2004.

M. Cappiello, et al., "Mobility Amoungst Heterogeneous Networks with AAA Support," IEEE International Conference, XP002278708, Apr. 28, 2002-May 2, 2002, pp. 2064-2069.

J. Kempf, "Problem Description: Reasons for Performing Context Transfers Between Nodes in an IP Access Network," RFC 3374, Sep. 2002, pp. 1-14.

* cited by examiner

CONTEXT TRANSFER IN A COMMUNICATION NETWORK COMPRISING PLURAL HETEROGENEOUS ACCESS NETWORKS

This is a continuation application of application Ser. No. 10/579,063 filed May 11, 2006, which is a national stage of PCT/EP2004/012083 filed Oct. 26, 2004, which is based on EP 03026069.9 filed Nov. 12, 2003, the entire contents of each of which are incorporated by reference herein.

FIELD OF THE INVENTION

Background Art

Every moving mobile node that is connected to a network may perform a handover to a new network at the time when it leaves the coverage area of the old one to sustain connectivity. If the mobile node has an ongoing data session over the connection than the connection will brake at least for the time of the handover process. Additional mechanisms like MobileIP can allow rerouting the traffic to the new point of connection so the session may be resumed. However, the handover duration is the lower time limit for the session discontinuity.

It is therefore appreciated to keep the handover duration as short as possible. A mechanism to preserve this is pro-active context transfer. Pro-active Context-Transfer allows establishing a session state in an access router (AR) or access point (AP), before the mobile node (mobile terminal) starts a handover to new network. The transfer is done through the backbone network the access router or access point is connected to. This could be for example the Internet.

The origin of the transferred data is an entity that has already knowledge about the context. In an alternative solution for the pro-active context transfer, the so-called reactive context transfer, the transfer of the context is started when the handover already has begun.

An important function to realize a pro-active context transfer is the selection of candidates to which the context is transferred before performing the handover. It is normally not predictable, which access router or access point is the next point of connection as the movement pattern of the mobile node is unknown. Generally, it is assumed that the cell coverage areas of the access points overlap such that a handover may be performed. However, if there are multiple new access points in reach this also gives only little help for the selection process of the new network to join.

Seamoby CTP and CARD

The IETF (Internet Engineering Task Force) working group Seamoby has developed two protocols concerning context transfer. These are the context transfer Protocol (CTP, see Loughney et al., "Context Transfer Protocol", Internet Draft, October 2003, all Internet Drafts and RFCs available at http://www.ietf.org) and the Candidate access router Discovery (CARD, see Liebsch et al., "Candidate Access Router Discovery", Internet Draft, September 2003). CTP serves as the protocol to initiate the context transfer and to carry the context data. Three parties are involved in the CTP communication, the mobile node (mobile node), the previous access router (pAR) and the next access router (nAR). All three, with different message types, can initiate the protocol exchange. If mobile node wants to or has to change its point of network access it sends a request at least to the next access router, in case it is already disconnected from previous access router. If the mobile node uses some sort of next access router prediction, maybe through CARD, it even sends a message to the previous access router starting context transfer to the predicted next access router before connecting to next access router itself. It contains the IP address of the next access router, mobile node's old IP address on previous access router, a list of to be transferred context data, the possibly known IP address on next access router and a flag requesting secure and/or reliable transfer of context. The context data, called "feature context", is then sent in a further message.

The CARD protocol consists of only two messages, the CARD request and the CARD reply. They even can be used between two access routers, the possibly next access router (nAR) and the current access router, called previous access router (pAR), or between a mobile node and a previous access router or next access router. Between access routers, CARD helps to get capability information of the next access router candidates that is needed to select the most suitable one for context transfer and later mobile node handover. Between mobile node and previous access router a CARD request is issued to demand a list of next access router candidates. In this request the mobile node can send any next access router data link layer (Layer 2) identifiers it might have detected by some mechanism, so the previous access router has a hint, which access router is in range of the mobile node. The way the previous access router identifies a next access router by its Layer 2 identifier is not specified in the CARD draft. In the reply to the mobile node previous access router sends a next access router list with the belonging next access router capabilities that could have been pre-filtered by a previous access router determined criteria to reduce the number of next access routers the mobile node has to process as candidates.

Context Transfer in Wireless Local Area Networks (IEEE 802.11f)

In Wireless Local Area networks (WLAN) information about the client or station (STA) between the access points (AP) involved in the handover allowing the re-association process at the new access point are exchanged. A context transfer scheme to accelerate this re-association process is used. Two functional entities, the access point and the RADIUS server are involved in the context transfer. For the station (STA) the management process is transparent. The RADIUS server fulfils the task of mapping delivered Basic Service Set Identifiers (BSSID) to IP addresses or Fully Qualified Domain Names (FQDN) of access points. This mapping implicitly shows if an access point belongs to the same extended service set (ESS) as the RADIUS server. It also distributes on request cipher keys to the access points to allow encrypted communication between two access points. The communication includes all management data that allows the movement of clients between the nodes and enforces the association of a client only with one access point at a time. The management messages can contain context data. Each access point in an ESS following maintains a dynamic representation of its neighboring access points. This representation is also referred to as the Neighbor Graph.

Important to note is that in the IEEE Draft IEEE 802.11f-D3 "Recommended Practice for Multi-Vendor Access Point; Interoperability via an Inter-Access Point Protocol Across Distribution Systems Supporting IEEE 802.11 Operation", January 2002, states in the annex B, section B.3.1, that context transfers between media with different service models should not be expected to be successful. Attempts to transfer context between cellular devices and IEEE 802.11 access points according to the IEEE 802.11 context transfer mechanism will fail unless the cellular access points implement the same set of services as the 802.11 access points. In conclusion the document states that context transfers between heterogeneous technologies will fail.

Other Mechanisms

Additionally to the access router and mobile node of the CTP scenario, the mechanism described in U.S. 2003/0,103, 496 A1 comprises a Policy Server (PS) that serves the task of retrieving the neighboring access networks (AN) and access routers capable of a context transfer (comparable to CARD mechanism). The access networks are indicated by Layer 2 information in beacon signals, received by the mobile node, and looked up in a local database by the PS. The PS communicates with neighboring Policy Servers if they are capable to serve the mobile node and pre-authenticates it with them. One drawback of this mechanism is that it needs even more secured connections (or Security Associations in other terms) than the CTP scenario. Next, it does construct the context from a dynamic and static part before sending to the new access network, but it does not take into account any features or capabilities of the target network.

U.S. 2003/0,092,444 A1 describes a mechanism that takes dynamic parameters like current traffic load and user rights into account for selection of neighboring candidates. The list of candidates may differ therefore for each mobile node. The transfer process itself is performed between the access routers of the access networks.

A mechanism for discovery of neighboring access routers, useable for a context transfer mechanism, is presented in U.S. 2003/0,087,646 A1 and is abbreviated GAARD. It allows detecting geographically neighboring access networks even if they are not topologically neighbors considering e.g. IP addresses. In this document, a mobile node has a local cache of Layer 2 (data link layer) addresses and Layer 3 (network layer) addresses. When the mobile node receives a beacon signal with a Layer 2 address and wants to initiate a context transfer to this node, it looks up the corresponding Layer 3 address in its cache. If the cache lookup fails, the mobile node requests the serving access router to lookup the corresponding Layer 3 address. The access router itself looks up its cache. If the address is not found, it starts a dynamic discovery process to derive the requested Layer 3 address. The access router returns the address to the mobile node that in turn uses it to start a context transfer or other handover mechanisms to the identified access router. The functionalities of this system must exist in every access router and mobile node that wants to use or support this system. The mechanism can serve as an implementation of the CARD process.

In contrast to the generic context transfer scenario, where all neighboring access routers are even possible points of access for a mobile node, the latter assumption is not true in a scenario of networks, working together on a contract base. A neighboring access router may belong to a network operator without a roaming agreement with the mobile node's home operator. So the mobile node receives beacons of the foreign network but an authentication process will fail, as the Authentication Authority in the foreign network is unable to connect to the home AAA (authentification, authorization and accounting) server of the mobile node or at least will not trust this unknown server. A context transfer to such a network will also fail for the same reason.

A way to integrate networks without a direct roaming agreement with the mobile node's home operator is the use of proxy AAA servers. The access network operator trusts the proxy AAA server of an operator that itself trusts the home operator of the mobile node. This way the mobile node can be authorized even in this foreign network.

It is probable that mechanisms like the context transfer in WLAN are developed also for other local area network technologies. Context transfer between topologically adjacent entities has the advantage of short distance, and this way low latency transfers.

Associated with the previous issue is the fact of a heterogeneous access network structure. It is very likely that a moving mobile node's context cannot be regarded as static data. It will change as the access network infrastructure of the new point of access differs from the previous one. The simple forwarding of context data to the new access network will not solve this issue.

A general problem of context transfer is the trust relationship between the entities involved in the context transfer process. In a scenario with an area containing a number of n neighboring access routers, transferring context data between each other, this gives an upper bound of $$\frac{n(n-1)}{2}$$

trust relationships between all the access routers. As these relationships are technically represented by some cipher key exchange between peers to allow encrypted communication, a large number n means a lot of storage space for key data sets, in the example n−1 data sets per access router. Also these relationships must be established before context transfer is possible between the peers, requiring a management function. A method to reduce the number of trust relationships would therefore save storage space and management effort. An already existing technology for secure data transport is IPSec naming the trust relationships Security Associations (SA).

A mobile node, in most cases, will be connected to its point of access by a wireless link. These links normally have lower bandwidth than wired links in the backbone part of the access network and the interconnection of the different access networks. This leads to higher transfer cost per amount of data in the wireless domain.

Another aspect is the power consumption of the mobile node. The consumption is directly correlated with the number of send packets to the wireless link. Both aspects lead to the objective to keep the amount of management traffic as low as possible, compared to the user payload traffic.

SUMMARY OF THE INVENTION

An object of the present invention is to solve at least one of the problems stated above.

This object is solved by the subject matter of the independent claims. Preferred embodiments of the present invention are subject matter to the dependent claims.

According to a first embodiment the present invention provides a method for a context transfer in a communication network comprising a plurality of heterogeneous access networks. A mobile terminal may be attached to one of the access networks.

According to the proposed method, a context transfer manager may receive location information and may determine neighboring access networks for the mobile terminal based on the location information. Further, the context transfer manager may generate at least one context for the neighboring access networks and the mobile terminal and transmit a context to each of the neighboring access networks and the mobile terminal.

The generation of the at least one context may be based on capabilities and parameters associated to the mobile client and capabilities and parameters of the neighboring access networks taking into account the respective access technology, and the context transfer manager may be common to the plurality of heterogeneous access networks in the communication network performs the context transfers related to the mobile station.

Hence, the present invention according to the first embodiment allows a context transfer even in case the mobile terminal performs a handover between access networks employing two different access technologies. Also when considering the access technologies used in the candidate access networks to which the mobile terminal may move, i.e. the neighboring access networks, a dynamic context may be generated which may be adapted to the respective protocols used by different access technologies. This is also facilitated by employing a common context transfer manager in the communication network since only the common context transfer manager may transfer the context to context managers in the different candidate access networks which requires far less security associations in the network. The benefits from the proposed architecture of the present invention will be outlined in more detail below.

According to a further embodiment, the mobile terminal receiving a beacon signal indicating the presence of another access network, performing a handover from the current access network to the new access network from which the beacon signal is received.

The context generated for each of the neighboring access networks and the mobile terminal may comprise a static or temporary identifier of the mobile terminal. The static or temporary identifier may e.g. be used by a context manager in a new access network to associate the mobile terminal to its context received from the context transfer manager. The latter may be facilitated if the mobile terminal includes the static or temporary identifier in the data transmitted to the new access network. Hence, by the inclusion of the identifier in a message transmitted to the context manager in the new access network the proposed method may facilitate the mapping of the context (previously) received from the context transfer manager to the mobile terminal.

The context received by the mobile terminal may also be used by same to pre-configure the mobile terminal based on the context received from the context transfer manager. Hence, e.g. by a pre-configuration of the network interfaces this process does not need to be performed when upon the mobile terminal connecting to a new access network.

The context transfer manager may further receive status information from the mobile terminal, wherein the status information indicate the quality of service achieved in the current access network and/or indicates unsuccessful access attempts to at least one other access network than the current access network.

Hence, this information gathered by the context transfer manager may be used by same to adapt several decision processes in the context transfer manager based on this information. E.g. the determining of neighboring access networks may also employ a selection algorithm which may be adapted based on the status information from the mobile terminal.

Another possibility would be that if clients report a connection failure to an specific access network, the latter may no longer be considered in the determination process of neighboring access networks and/or an appropriate error message may be generated which may be addressed and handled by the access network's operator or the context transfer manager's operator. For the latter purpose, the context transfer manager may store information on failed access attempts to access networks reported by the mobile terminal.

The capabilities and parameters considered during context generation and associated to the mobile client may comprise at least one of static and/or temporary terminal identifiers, user preferences the requirements for the terminal's communications, guaranteed service quality parameters, and/or access permissions to services, session data comprising encryption keys, seeds, ciphers and/or header compression information, terminal capabilities comprising information on the display, network interfaces, processing power, supported applications and/or video/audio codecs. As becomes obvious, several access network specific parameters which may address different access technologies in the access networks may be used to generate a dynamic context. The same also applies to the capabilities and parameters of the neighboring access networks comprise which may comprise at least comprise at least one of access technology specific attributes comprising a radio frequency, data rates, channels, and/or coding schemes, access network specific attributes comprising cryptographic capabilities of the respective access network, an access network identifier, supported quality of service mechanisms, available traffic classes, local services, information portals, and/or public transportation information.

The location information received by the context transfer manager may be received in a paging message transmitted by the mobile terminal, from an authentication procedure performed between the mobile terminal and an authentication server or by an entity located in the access network to which the mobile terminal is connected. Taking the second example, a mobile terminal that performs an initial authentication procedure for the access network to join e.g. with the associated AAA server may provide location information to the AAA server. This information may be also available to the context transfer manager such that same may use the location information from the authentication procedure to determine neighboring access networks. Further, the context transfer manager may also initiate a context transfer in response to the authentication procedure of the mobile terminal.

Further, the location information may be based on a geographical location obtained from a location determining device, e.g. a GPS receiver, or a network related location determined based on a network address and/or network prefix. Taking as an example the usage of the IP protocol, the network address corresponds to an IP address while the network prefix would be the subnet mask.

According to a further embodiment of the present invention, the handover of the mobile terminal may be performed upon having received context information from the context transfer manager related to the new access network. Hence, also a pro-active context transfer may be realized by the employing the present invention.

For the description of the context generated, a markup-language based data format may be employed. Further, this format may also be used to describe the context transferred from the context transfer manager to the plurality of access networks and the mobile terminal.

In another embodiment of the present invention an authentication server in a neighboring access network receiving the context from the context transfer manager may perform a registration and/or authentication procedure of the mobile terminal with access network using the received context information. Further, the registration and/or authentication of the mobile terminal may comprise a registration of a security key of the mobile terminal.

The mobile terminal may use the registered security for communication upon attaching to the neighboring access network in which the security key has been registered.

Another embodiment of the present invention considers the situation in which the mobile terminal is attached to a foreign communication network, i.e. a so-called visited communication network. In this embodiment, the context transfer manager may reside in a visited communication network. In the present invention a communication network may be interpreted as an administrative domain, i.e. a network comprising at least one core network and a plurality of access networks of an operator or of access networks of providers having service level agreements with the operator. Hence, this embodiment may be related to situations in which the mobile terminal resides in another administrative domain than its home domain.

In order to allow the visited context transfer manager, i.e. the context transfer manager in the visited communication network to generate an appropriate context for context transfer, the context transfer manager in the home network of the mobile terminal may transmit data relevant for the generation of the at least one context to the context transfer manager of the visited communication network.

Further it should be noted that a context manager in an access network may receive the context from the context transfer manager, wherein the context manager maintains no connection to another context manager in another access network. Hence, the context managers in the different access networks may not need to maintain a connection to each other and to transfer or forward the context to each other directly—if possible at all—but may receive the context from an entity on a higher hierarchical level, the context transfer manager.

Another embodiment of the present invention provides a context transfer manager in a communication network comprising a plurality of heterogeneous access networks, wherein a mobile terminal is attached to one of the access networks. The context transfer manager may comprise receiving means for receiving location information, processing means for determining neighboring access networks for the mobile terminal based on the location information, context generation means for generating at least one context for the neighboring access networks and the mobile terminal, and transmitting means for transmitting the respective context to each of the neighboring access networks and the mobile terminal. Further, the context generation means may be adapted to generate the at least one context based on capabilities and parameters associated to the mobile client and capabilities and parameters taking into account the respective access technology of the neighboring access network. Moreover, the context transfer manager common to the plurality of heterogeneous access networks in the communication network may perform the context transfers related to the mobile station.

The context transfer manager may be adapted to perform any of the methods described above.

In a further embodiment of the present invention, a mobile terminal adapted to perform one of the methods above is provided. The terminal may be adapted in that it may signal failed access attempts to access networks to the context transfer manager or in that it may receive context information provided in a markup language format.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION

Figure 2:
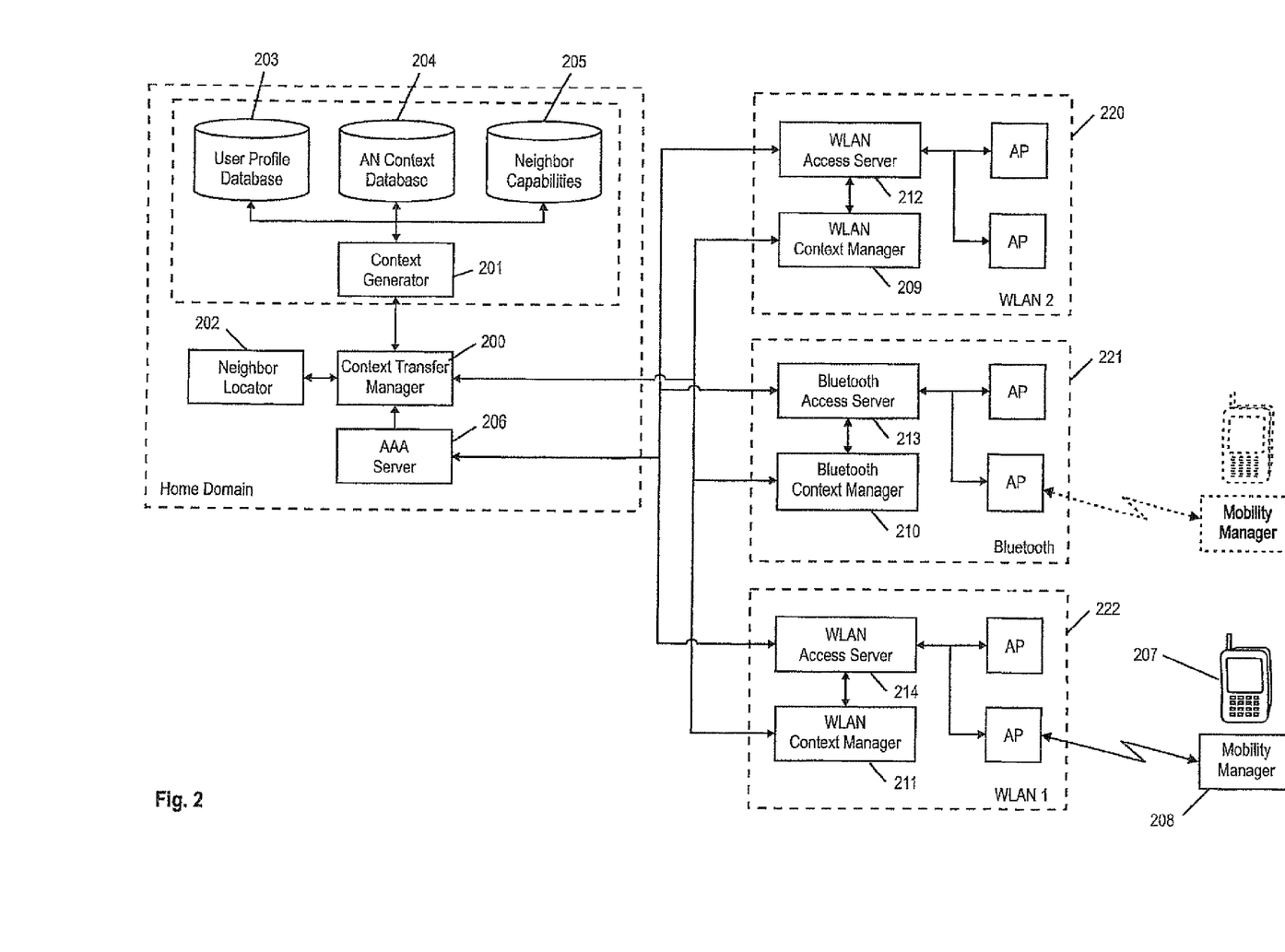
FIG. 2 shows an architectural overview of a communication network managing a context transfer for a mobile node according to an embodiment of the present invention.

An architectural overview of a communication network that manages the context transfer for a mobile node according to an embodiment of the present invention is shown in FIG. 2. The architecture is distributed across the network of the mobile node's home domain, the mobile node 207 itself and the access network.

A context transfer manager (CTM) 200 may be collocated with the AAA server 206 of the home domain. The context transfer manager 200 may send appropriate, dynamically created context data to the neighboring access networks of the mobile node's current position. These neighbors are detected by a neighbor locator 202 function that got the current location of the mobile node 207 (e.g. IP address or network prefix) from the context transfer manager 200 and are returned in a neighbor list. This neighbor list together with information about the user of the mobile node 207 may be provided to the context generator 201. The context generator 201 may maintain databases about capabilities of the access networks and mobile nodes and about context formats (see User Profile Database 203, Access Network Context Database 204, Neighbor Capabilities database 205). Based on this information, a suiting context, e.g. taking into account the distinct terminal identifiers, subscription information, user preferences, terminal capabilities, Quality of Service parameters, encryption and compression information, access technology specific attributes or access network specific attributes, may be generated for each neighboring access network. This context may be then transferred to the access networks in a pro-active way, where it is instantiated by the context manager (CM) 209, 210, 211 of the access network (AN). The mobility manager 208 function on the mobile node 207 may also be informed of the neighboring networks 220, 221, 222, including the information that is needed to perform an accelerated handover to them, using context transfer. Based on the context received from the context transfer manager 200 the mobile node 207 may (pre-)configure its network interfaces for the next points of access. The mobile node 207 itself may make the handover decision, when it receives beacon signals of a neighboring network in reach.

Figure 6:
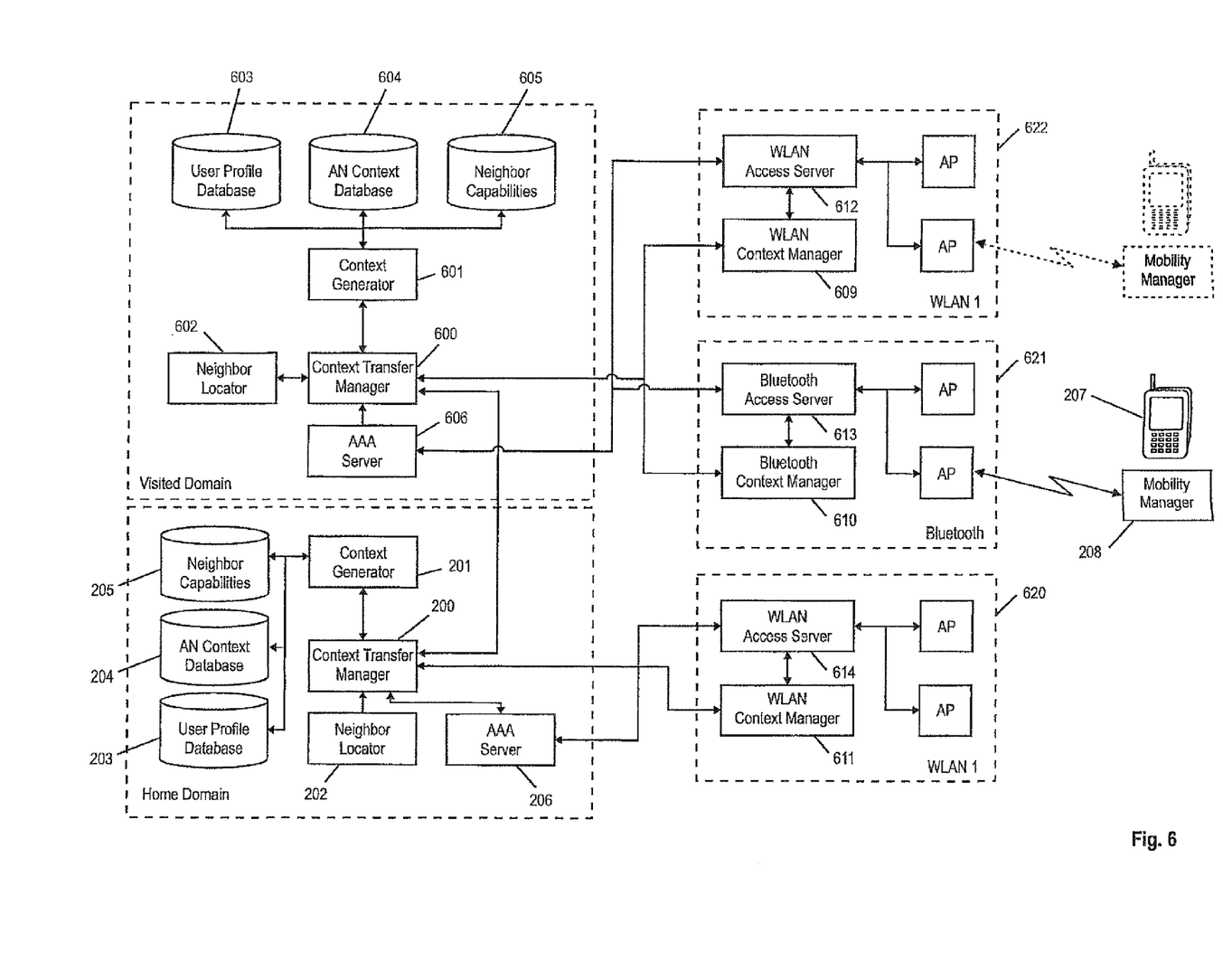
FIG. 6 shows an architectural overview of a communication network managing a context transfer for a mobile node attached to a visited network according to an embodiment of the present invention.

When the mobile node 207 is roaming to a foreign domain, the context transfer management may be done by the context transfer manager 600 of the visited operator (see FIG. 6). The context transfer process is similar to the non-roaming case, only adding a handover of the management from the home context transfer manager 200 to the visited context transfer manager 600.

Next, the context transfer manager 200, 600 will be described in more detail. The main instance for context handling may be the context transfer manager 200, 600 (CTM). It may control the functions having access to the needed context information. In the architecture functions to control may be the context generator 201, the neighbor locator 202, the access network (AN) context manager 209, 210, 211, 609, 610, 611 and the mobility manager 208 function. At first the context transfer manager 200, 600 may receive the current location of the mobile node 207 through the communication with the mobility manager 208 or by means of standard authentication procedure e.g. when a mobile terminal 207 is turned on and attaches to the access network.

The context transfer manager 200, 600 may then determine all neighboring access networks 220, 221, 222, 620, 621, 622 of the mobile node 207 using the neighbor locator 202, 602. Next, the context transfer manager 200, 600 may signal the context generation function 201, 601 to retrieve the user information relevant for the context used by the neighboring access networks 220, 221, 222, 620, 621, 622 of the mobile node 207. The signaling may comprise a user ID and an applicable network ID for the neighboring networks 220, 221, 222, 620, 621, 622, such as a network prefix. Another parameter included in the context may be an additional unique static or temporary identifier for the user that the access network may use later for off- or online charging of delivered services. One may think of the IMSI (International Mobile Subscriber Identity) in GSM or UMTS or possibly a pseudonym NAI (Network Access Identifier, see Aboba et al., "Network Access Identifier", RFC 2486, January 1999) used as a static or temporary identifier, respectively.

After the integration of this information into the context data, the context transfer manager 200, 600 may send the context data to the access network context manager 209, 210, 211, 609, 610, 611 and parts of this generated context information to the mobility manager 208 of the mobile client 207 (mobile terminal). These parts of information may enable the mobile node 207 to configure its network interfaces and to use the correct identifier on following neighbor network access attempts.

In addition to the tracking information of the mobile node 207, the context transfer manager 200, 600 may also accept status information from the mobility manager 208. In the status information the mobile node 207 may signal reached Quality of Service (QoS) in the current network or complete failure of access to another access network. This may allow dynamic adaptation of the selection algorithm for the best-suited access networks in the neighbor list, helping other mobile nodes moving in the same area to select an appropriate new access network. In this way the mobile node 207 may serve as a network probe gathering information on the network status. If many mobility managers signal the failure of the context assisted handover in a single access network, the context transfer manager 200, 600 may inform a management and operation function of its own network to further investigate this error or may inform the operator of the access network.

Further, the context generation function in the context generator 201 will be discussed in further detail in the following. As stated above, the basic Seamoby CTP scheme has restrictions, when it is implemented in heterogeneous networks or networks in different administrative domains. This belongs to the creation of a 'context'. A context may not be a set of pure user-related data alone, like identity, password or encryption key. Particularly it may further describe the state of the network, seen from the perspective of the client. The information on the network status may for example comprise access rights to network services, an encryption algorithm for transported data, a routing policy for the user data, a traffic class assigned to the users session traffic or accessible network entities (DNS server, default gateway, etc). In a single administrative domain it is possible to keep this data static throughout the whole network, if demanded by the operator. Crossing the border to other domains, this data may be changing or, so to say, may get dynamic. A very tight coupling between the operators may be needed to prevent this, if ever possible. Hence, the approach suggested by the present invention to make the context transfer adaptive to these dynamics is of advantage and solves above stated problems.

Figure 3:
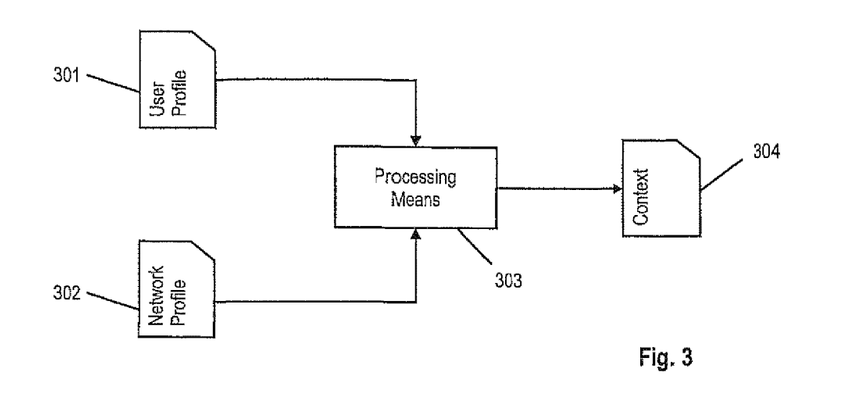
FIG. 3 shows a context generation process according to an embodiment of the present invention.

A context generation process according to an embodiment of the present invention is shown in FIG. 3. The context creation process may be split into four parts, two source data objects, one processing function and one resulting data object. The two static data objects represent the user parameters 301 (including terminal parameters and capabilities) and network parameters 302 and capabilities. Based on these two parameter sets, the processing function 303 may derive the resulting data object, i.e. the dynamic context 304. Since, network related parameters also depend on the access technology used in a respective access network, the contexts for access networks having different access technologies may vary. As an example, imagine several algorithms inside the processing function that produce session encryption keys, state flags or user-id handles. The data object for user parameters may comprise a description of the user identity including temporary identities, user preferences like QoS requirements or allowed session types (e.g. video, voice), encryption keys or seeds and installed ciphers and terminal capabilities like screen resolution, processing power, audio/video codecs and applications available, network interfaces, etc.

Not only context relevant data may be included in the data object. This favors the use of a generic user data storage eventually existing for other purposes (e.g. Generic user profile GUP of 3GPP). The data object for network parameters may comprise information on the specific access network to that the resulting context may be transferred later.

Considering user specific and/or terminal specific parameters as well as parameters depending on the respective access technology of the next access network it may be possible to create a dynamic context which may preventing a failure of a context transfer in case the mobile terminal 207 accesses a new network. It could be data like supported cryptographic algorithms or a WLAN SSID (service set identifier) included in network beacons, helping the mobile node 207 to identify the WLAN to choose. Again not only context relevant data may be included in the data object 304 (context), but also data sets belonging to other applications that use the object. In general a XML derived language may be used to describe context data for example being used for the GUP or for the Composite Capabilities/Preferences Profile (CC/PP). The W3C languages XPath and XQuery for data search and selection inside a XML document and XSL may be employed. XSL may be used to transform XML documents and post-process them into arbitrary output formats. Additionally, the usage of a markup language to describe the context information may be employed to extend the data description in a safe and easy way, staying compatible to older descriptions. As the on-demand context generation may solve the issue of context transfer to incoherent networks, it may additionally provide the capability to keep some or all user or network parameters dynamic. A user may change his/her user preferences, the forthcoming next context transfer in the communication network may immediately adapt to the new preferences (higher session QoS, new encryption mode, etc.).

The mobility manager 208 in the mobile terminal 207, beside others, may control the network interfaces and may track the movement of the mobile node 207. Therefore the best location may be the mobile node 207. Alternatively, the access network may also track the mobile node's location based on the terminal's movement when changing from one access point to another. In case of the mobility manager 208 being located at the mobile node 207, the status information may be included in paging messages transmitted from the mobile client 207 to the context transfer manager 200. The mobility manager 208 may signal the movement and position of the mobile node 207 to the context transfer manager 200. Therefore it can use information, gathered by a built-in position determining device, such as a GPS (Global Positioning System) receiver or e.g. by evaluating received network beacons or Router Advertisements received.

The location may be represented by a geographical or a virtual, i.e. network related location. Multiple formats for describing the mobile terminal 207s location may be supported to allow different techniques to be implemented in the mobile node 207 and to get different information from the diverse location representations. This is motivated by the fact that a single technique does not fit all needs. GPS for example may provide highly accurate location information on the terminal's location but needs a direct line of sight to the GPS satellites for location calculation. Especially in cities with a high skyline this may sometimes be impossible to obtain. The network-related location (e.g. network address and prefix) of a mobile node 207, as another example, may help to gather information about the network, the mobile node 207 is connected to (e.g. to get the address of a access server). But the single network address of the mobile node 207 has not to be similar to the address of a geographically adjacent network. An additional mechanism may therefore be used to compute the neighbors to a given network address (e.g. Neighbor Graphs).

The network control part of the mobility manager 208 may be enabled to pre-configure the network interface(s) of the mobile node 207 with the information, received inside the context from the context transfer manager 200. The network control part may hold the different configuration presets for any of the signaled neighboring access networks inside a local cache and may instantiate the appropriate one, when it detects a handover situation. The handover may be actively started by the mobility manager 208, if it determines the need for switching, e.g. an application may need a higher bandwidth or the current connection may be fading.

The mobility manager 208 may further solve the task of communicating a change in the users preferences on network connection or QoS requirements to the context transfer manager 200. These preferences influence the selection of suitable network neighbors and the context generation process.

The access network context manager 209, 210, 211, 609, 610, 611 (AN context manager) may process the received context data. In this process, the access controlling entities, i.e. the Access Servers 212, 213, 214, 612, 613, 614 in the access networks 220, 221, 222, 620, 621, 622 (see FIGS. 2 and 6) may be configured for the possibly moving mobile node 207. The configuration process may be transparent to the outer network and to the context transfer entity that sent the context. The only requirement may be the usage of a defined template describing the context format that the context generator 201, 601 in the context transfer manager 200, 600 may fill out and which the access network context manager 209, 210, 211, 609, 610, 611 may understand and instantiate. Internal information about the network can be included, as both sides have a trust relationship to protect against an abuse of the context transfer data. The internal access network configuration by the access network context manager 209, 210, 211, 609, 610, 611 may include an access network wide context transfer mechanism to allow the acceleration of intra-domain handovers.

The neighbor locator 202, 602 may retrieve the neighbor access networks of the mobile node 207. The neighbor locator 202, 602 may obtain the mobile node's location from the context transfer manager 200, 600 beforehand. With the location information it may look up a network representation that stores neighbor relationships (see databases 203, 204, 205 in FIG. 2 or databases 603, 604, 605 in FIG. 6). The representation may be dynamic or static.

Seeing WLAN as an emerging technology for wireless broadband access in public and company areas, the 3GPP identified the requirement of an interworking mechanism between WLANs and 3GPP cellular networks. Therefore, the 3GPP has defined six different scenarios that describe service levels supported by a WLAN interworking with a 3GPP network.

Figure 1:
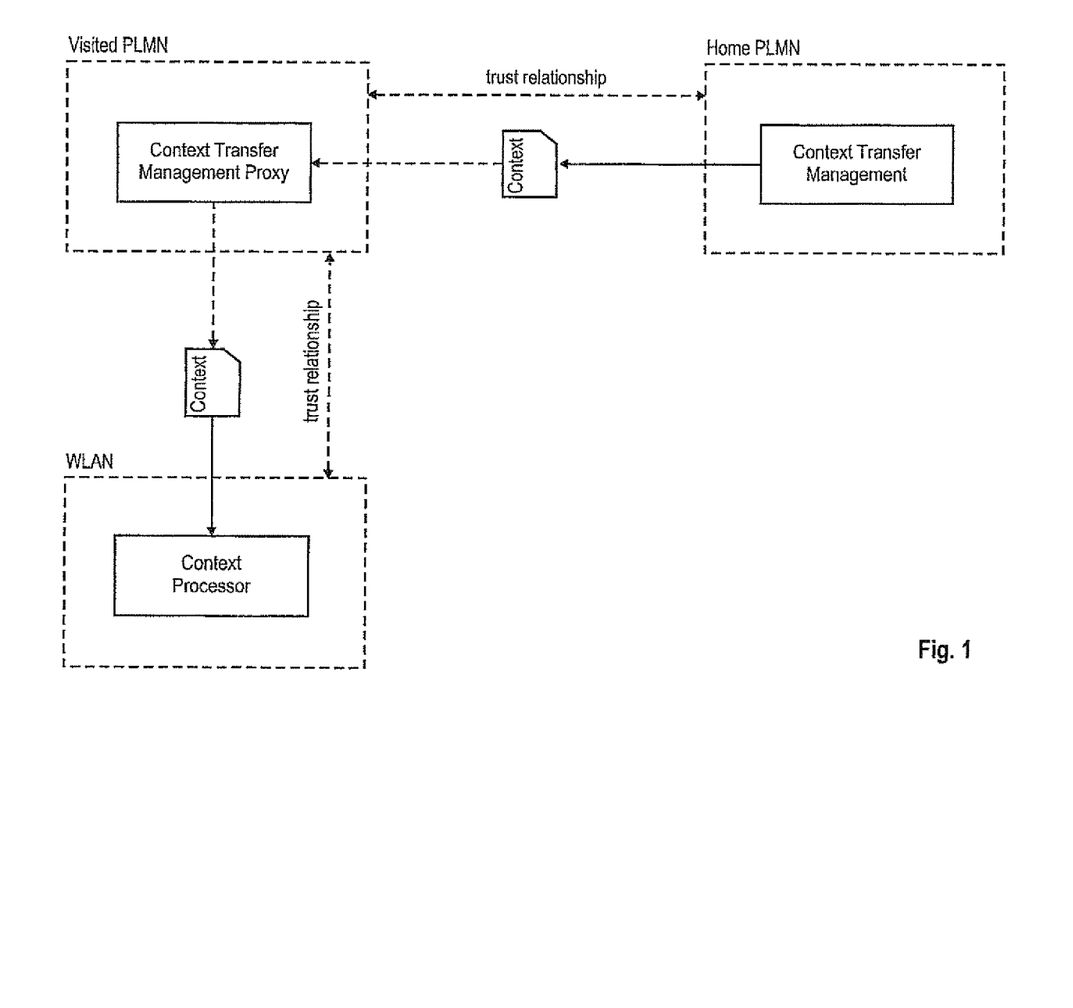
FIG. 1 shows a simplified structure of a context transfer from a home domain through a proxy of a visited domain to a WLAN according to one embodiment of the present invention.

In the 3G-WLAN Interworking scenario there exists a centralized AAA structure with the Diameter servers. This structure also has Security Associations (SA) that could be reused for the securing of the context transfer, here between visited public land mobile network (VPLMN), home public land mobile network (HPLMN) and WLAN access networks. The present invention may provide a chained trust relationship between the home and visited context transfer manager, such that a successful context transfer to the foreign network may be possible. Therefore a context transfer solution for this scenario may implement proxy functionality for context transfer, building a system for hierarchical context transfer. FIG. 1 shows the simplified structure of a context transfer from a home domain (e.g. HPLMN) through a proxy of a visited domain (e.g. VPLMN) to a WLAN where the context is processed and instantiated.

The access router-to-access router context transfer scenario, i.e. the context transfer from the previous access router (pAR) to the next access router (nAR) may therefore be changed.

The three involved entities according to the present invention may now be the mobile node 207, the next access router and the AAA server 206. The mobile node 207 may transmit a context transfer request to the AAA server 206. Upon this, the AAA server 206 may transfer the context of the mobile node 207 to the next access router. This may recommend a trust relationship between the next access router and the AAA server 206, which already exists if the WLAN AR operator has a roaming agreement with the AAA server 206 operator. Given m as the number of roaming partners, this leads to m security associations per each of n access routers and n·m security associations over all.

This number should be substantially lower than in the access router-to-access router context transfer scenario. Another benefit is that a CARD-like functionality in the access routers may no longer be needed as the AAA server 206 does the neighbor discovery. Only a context transfer agent may be present in the access routers. In general the neighbor discovery functionality may be invisible to the network and may therefore be implemented in a vendor specific way. Even the problem of incompatible context data between two access routers, expected at least at vertical handover between different administrative domains, may be faced more efficiently with the AAA server 206 imitating a previous access router.

In case the AAA server 206 has exact knowledge of next access routers capabilities through the neighbor discovery process, it may dynamically adapt the context to the capabilities of the targeted next access routers. Having access to the complete user profile it may be possible to create a suitable feature context in opposite to the inter-access router context transfer that has only a reduced set of information.

A mobile node 207 that roams in a foreign or visited domain (e.g. VPLMN) may not be assisted by the home context transfer manager 200 directly, as the context transfer manager 600 may have no or not sufficient information about the access networks 621, 622 of the foreign domain. The home context transfer manager 200, i.e. the context transfer manager 200 in the home domain of the mobile client 207, may not be able to generate context data for the access networks. Hence, the mobile node 207 may be assisted by the context transfer manager 600 of the foreign domain, i.e. by the visited context transfer manager 600 (VCTM). To allow the VCTM 600 to assist, the home context transfer manager 200 (HCTM) may deliver the needed parts of the mobile node's or user's profile to the VCTM 600.

FIG. 6 shows the network's architecture for a home and visited domain controlling individual access networks. A context transfer manager 600 in a visited domain (VPLMN) may have the possibility to tailor the received data for a targeted access point or access network. Like the context transfer manager 200 of the home operator the VCTM 600 may maintain databases 603, 604, 605 about the access networks 621, 622 that have Service Level Agreements (SLA) with its own operator, about their capabilities and their required context format. Further, the visited context transfer manager 600 may also retrieve information from the AAA server 606. The difference for a context transfer manager 600 in a VPLMN (VCTM) serving a mobile node 207 and its mobility manager 208 may be the non-permanently stored user profile for the roaming mobile node 207.

A substitute for this profile may be what is transferred between the context transfer manages. The use of the Generic user profile (GUP) or a derivate of CC/PP may be useful for signaling. Nevertheless the data transferred may not be a direct copy of the original user profile located in the database of the home context transfer manager 200. At least the user's identity may be replaced by a temporary pseudonym that allows to identify a user's session and to account the delivered services for the pseudonym, but does not allow information gathering about user's habits or movement pattern across multiple sessions. Further all data that has no influence on the context generation process may be stripped from the temporary profile transferred by the home context transfer manager 200 to the visited context transfer manager 600.

The transfer of the temporary user profile may be secured using encryption. The encryption process may supply confidentiality as well as integrity protection. Confidentiality alone may still allow an attacker to insert bogus data into the user profile, which may serve as a Denial of Service (DoS) attack. The secure connection itself may be established using the Security Association that exists between the two operators. A specific application protocol for the data may not be needed.

The recommended mode for context transfer may be the pro-active mode, as it is less time critical. However it is also possible to use the reactive mode. In this case the mobile node 207 requests a context transfer after the start of the handover process. The context transfer manager 200, 600 may receive the request through the new access network 221, 621 and may return the context of the mobile node 207 to the access network context manager 209, 210, 211, 609, 610, 611. The context transfer manager 200, 600 may be able to keep the response time short by tracking the movement of the mobile node 207 and by pre-processing and caching of context for the neighbors.

Figure 4:
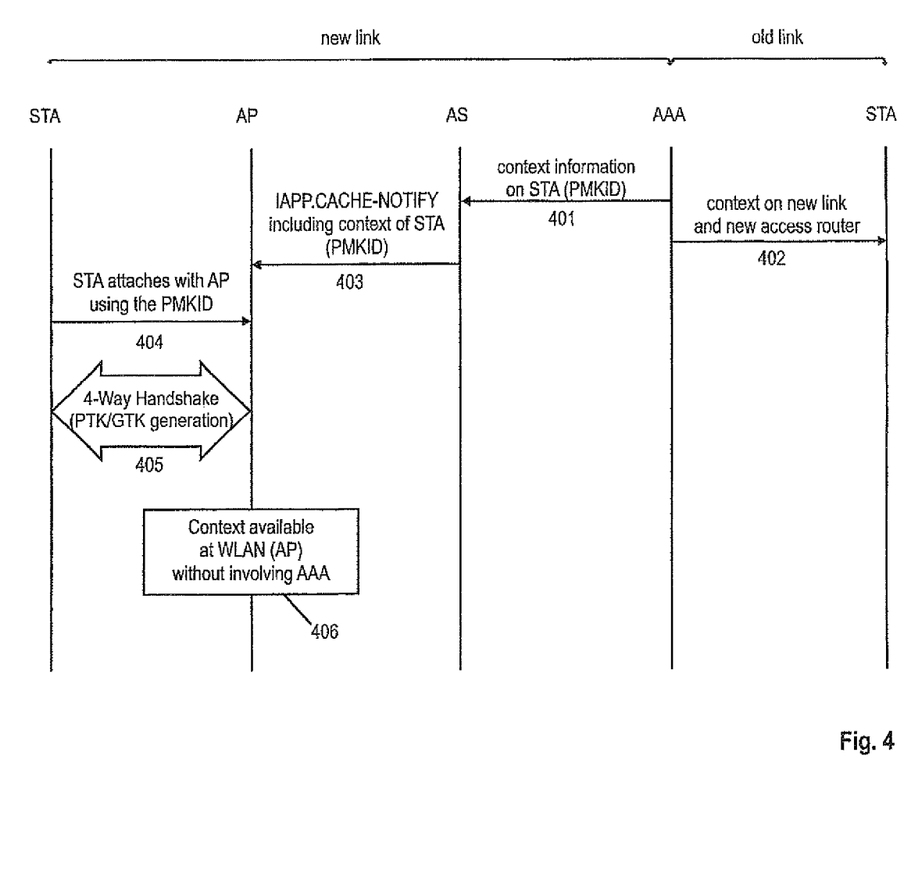
FIG. 4 shows a context transfer process from an external AAA server with context transfer functions to an Authentication Server (AS) or access router of a WLAN according to an embodiment of the present invention.

An example of a context transfer process from an external AAA server with context transfer functions (CTM, context generator 201 etc.) to the Authentication Server (AS) or access router of a WLAN will be given in the following in reference to FIG. 4.

The following assumptions may be made for the example: The mobile node is allowed to use the WLAN by an agreement between WLAN and 3GPP operator. The mobile node's home operator has sufficient information about the capabilities of the WLAN, stored in a database and has the technical capability to derive the needed cryptographic data. The mobile node is in the state of being connected to an access network and not yet beginning a handover to a new access network. Further the Authentication Server (AAA) in the WLAN is enabled to send the IAPP.CACHE-NOTIFY message to access points, requesting the AP to insert a context entry for a mobile node in its cache, a message that is normally exchanged in IEEE 802.11f-D5 "Recommended Practice for Multi-Vendor Access Point; interoperability via an Inter-Access Point Protocol Across Distribution Systems Supporting IEEE 802.11 Operation", IEEE Draft, January 2003, networks between two access points.

The AAA server may transfer 401 a suitable context to the Authentication Servers of the WLANs that were detected as neighbors by the Neighbor Selection process. Next, the AAA server may inform 402 the UE (i.e. the mobility manager in the mobile terminal) via the current link of its context parameters (e.g. the Pairwise Master Key, the SSIDs of the WLANs etc.) for the next possible connections to other access networks. The context parameters may be usable for intra-WLAN 'feature contexts' as well. Other independent context fields may also be included.

Every neighboring Authentication Server that received the context with valid data may initiate an IAPP.CACHE-NOTIFY message 403 to all relevant Access points containing the received context. Every WLAN access point may have an application that reads the delivered context in an IAPP.CACHE-NOTIFY message and inserts the context, which may in our case be a Pairwise Master Key (PMK) Security Association (SA) into the PMK SA table. For the access point it now seems as the mobile node has gone through the key establishing process which would usually be performed upon a new client accessing the access network.

When the mobile node or client associates 404 with an access point for which it has received context data through the former connection, it may directly send the PMKID inside the Robust Security Network (RSN) Information Element, which is listing key ciphers, authentication and key management algorithms supported by the STA (see section 7.3.2.9 in IEEE 802.11i-D5 "Medium Access Control (MAC) Security Enhancements", IEEE Draft, August 2003), of the association request.

The access point may then identify the PMK referenced by the PMKID and directly starts the 4-way handshake 405 with the client circumventing the initial EAPOL process. This saves both the authentication handshake between the access point and the access server and the authentication handshake between the WLAN access server and the AAA server.

The 4-way-handshake between client and access point generates fresh temporary Pairwise and Group keys (PTK and GTK) to secure the following unicast and multicast user data transfers.

If the client further roams 406 inside the extended service set (ESS) an ongoing context transfer in the WLAN may be accomplished by internal mechanisms without the interaction of distant AAA server.

The context transfer process between the AAA server and the Authentication Server in the WLAN is identical for HPLMN and VPLMN AAA servers. This may be accomplished by the handoff of context transfer management between the context transfer managers in the home and visited domain. The WLAN Authentication Server may not distinguish between the original and the post-processed context from the proxy context transfer manager. It may only differentiate between context data from untrusted or trusted sources.

It may be possible that the listed process fails because of a timeout of the Security Association in the access point's PMK security association cache or a completely failed context transfer to the WLAN. In this case the 4-way handshake fails and the normal authentication procedure using e.g. the Extensible Authentication Protocol (EAP) handshake is started. For this handshake an EAP mechanism that allows mutual authentication may be used. In our example given, mutual authentication may be provided using mechanisms as describe in the IETF drafts EAP-SIM and EAP-AKA (see Haverinen et al., "EAP SIM Authentication", IETF Internet Draft, October 2003, and Arkko et al., "EAP AKA Authentication", IETF Internet Draft, October 2003). They use the cryptographic functions in the SIM (Subscriber Identity Module) or USIM (UMTS SIM) cards for user identification and key generation.

The generation of the PMK security association data will be explained in further detail in the following sections. The standard mechanism uses a hash function (HMAC-SHA1-128) to create the PMKID. The hash function is a one-way function, so it cannot be used to retrieve the source information for the hash algorithm directly. A hash function only allows checking if a hash function with unknown input parameters has come to the same result as a reference hash function with known input parameters. If the results are identical then the input parameters must also have been identical. For PMKID generation, the values PMK, PMK Name, BSSID (basic service set identification) and client's MAC address may be taken as input values for the hash function. These values are available to an access point when a client attaches to it. So the access point may create the complete PMK security association entry. In our example, this entry may not be created by a local access point but the context transfer manager 200 may create the entry. The context transfer manager 200 may have knowledge about the SSID of the WLAN through its access network capabilities database, but it has no knowledge about the access points, especially their BSSIDs, in the access network the client roams to. This implies that the context transfer manager 200 may not use the BSSID in the calculation of the PMKID with the HMAC-SHA1 algorithm.

One solution may be to defer the PMKID calculation and thus the context transfer to the access network until the client has heard the BSSID and SSID through beacon messages and before it has already switched to this access network. The mobility manager 208 may then send the detected BSSID and SSID back to the context transfer manager 200 that determines the access network by the SSID.

According to another embodiment of the present inventions the context transfer manager 200 may calculate the PMKID and makes the context transfer to the access network's context transfer manager 200 and through this to the access point with the detected BSSID. It may be likely that the context does not reach the access point which would result in a reactive context transfer again. A single context message for every access point in the access network may be send. This may require complete knowledge of the WLAN infrastructure for the context transfer manager 200, which cannot be expected.

Another solution for the problem of generating a PMK security association may be to delegate the processing of the PMKID to the context manager 209, 210, 211 in the WLAN. The context manager 209, 210, 211 may send the calculated PMKID to the access point together with the clients additional context received from the context transfer manager 200. The client itself may have calculated the same PMKID with the information on the access network received through the mobility manager 208 from the context transfer manager 200 and the detected BSSID in WLAN beacons. This solution takes the load of PMKID calculation from the context transfer manager 200 and distributes it to WLAN context manager 209, 210, 211 and the mobile client 207, which may result in a performance issue only. The client should be able to perform the calculation anyway, in case context transfer fails.

For WLAN the PMKID only serves as a unique and unpredictable identifier for selecting a PMK Security Association out of a cache. The validity of the Security Association itself may be checked inside the 4-way handshake (see FIG. 4) with a challenge/response technique using the PMK that is never exchanged between the peers. A right guess of a PMKID of a rogue client thus still does not compromise a Pairwise Master Key. This may allow a shortcut for our problem of not being able to calculate the correct PMKID. The context transfer manager 200 may generate a random 128 bit number as the PMKID without using the hash function.

This shortcut may implies two issues: first the PMKID may be propagated from the context transfer manager 200 through the WLAN context manager 209, 210, 211 to the access point, second, there may be a probability of collision between the randomly generated PMKID and the entries in the local PMK security association cache of an access point. The following sections provide an estimate of the probability for a collision:

It may be assumed that the HMAC-SHA1 algorithm creates equally distributed hash values. The PMKID has 128 bits, which leads to $3.4 \cdot 10^{38}$ possible values and gives the probability of $P(x)=2.9 \cdot 10^{-39}$ for a distinct value to be drawn. For our case this means, our randomly calculated PMKID matches the PMKID entry in a cache containing one entry with this probability $P(collision)=P(x)=2.9 \cdot 10^{-39}$. If we assume a cache size of n PMKID entries, the probability for a collision gets $P(collision)=n \cdot P(x)=n \cdot 2.9 \cdot 10^{-39}$. For 1000 cache entries this results in a probability of $P(collision)=2.9 \cdot 10^{-36}$ which is still a very small probability.

As a benefit the context transfer manager 200 may distribute the PMKID beforehand and neither the client nor the WLAN context manager 209, 210, 211 may have to calculate the PMKID itself saving processing time and power and possibly shorten the time until the association request from the client may be ready to send to the access point. For the WLAN context manager 209, 210, 211 this may imply sending the same context data set to all needed access points and not to calculate a specific context for any access point.

Figure 5:
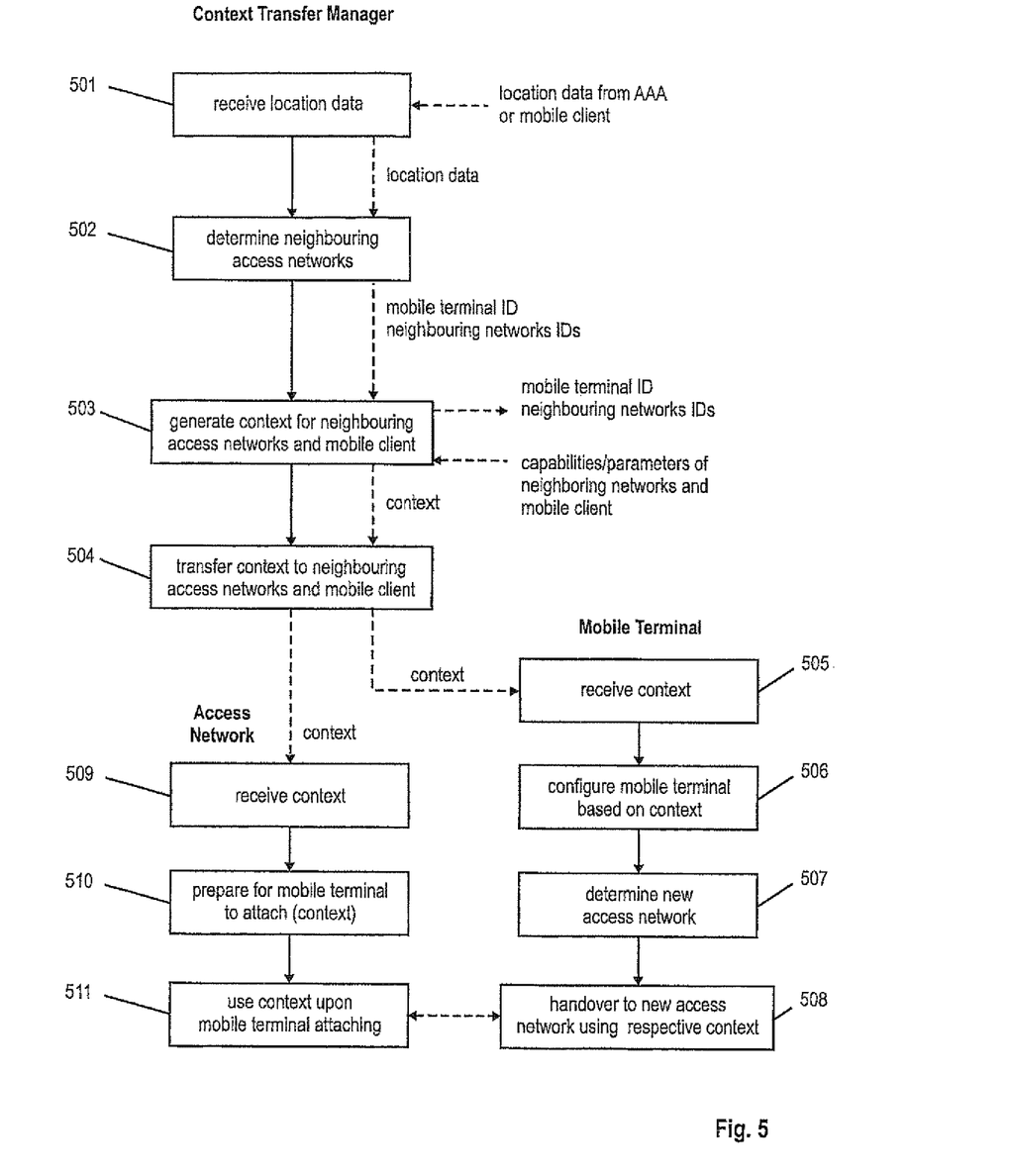
FIG. 5 shows a flowchart of a context transfer process according to an embodiment of the present invention.

Next, an overview over the context transfer mechanism proposed by the present invention according to another embodiment will be outlined in reference to the flowchart shown in FIG. 5. The context transfer manager 200 may receive 501 location information to be evaluated from the mobile node 207 or an AAA accessible by the context transfer manager 200. Upon receiving the location information from a delivering source, the context transfer manager 200 may pass the information to a function or means determining 502 neighboring access network based on the mobile node's position, to which the mobile node 207 may connect in case of a handover. This function may for example be realized by the neighbor locator 202 as shown in FIGS. 2 and 6.

The neighboring access networks to which the mobile node 207 may connect are for example identified by an identifier as outlined previously. Further, a mobile node's identifier may also be included in the information delivered to the next processing step. Based on the ID's identifying the neighboring networks and the mobile node 207, the context transfer manager 200 may use a context generation function or means to dynamically generate 503 a suitable context for the neighboring access networks and the mobile node 207 next. It is important to note that depending on the neighboring networks' access technologies the contexts generated by the context transfer manager 200 may differ in their parameters. The mobile node 207 may also receive a context which is especially tailored to the information needed for handover as outlined previously.

Upon having generated the different contexts for the neighboring networks and the mobile node 207, the context transfer manager 200 may transfer 504 all contexts to the respective access networks and the mobile node 207.

When receiving 505 the context at the mobile node 207 and for exemplary purposes assuming that the handover to the next access network has not been performed yet, the mobile node 207 may preconfigure 506 its network devices based on the information comprised in the context received from the context transfer manager 200. E.g. in case of using a WLAN interface in a IPv6 network, the mobile terminal 207 may create preconfigure the network interface with a new IP address, the new default gateway, etc. such that upon determining 507 the access network to join next and upon handover to it, the preconfiguration settings may be taken over and communication to the new access network may immediately be started 508 using the new configuration of the network interface.

An access network receiving 509 a context from the context transfer manager 200 may also use the information therein to prepare 510 the access network for a possibly attaching mobile client 207. To be able to associate a specific configuration for an attaching mobile client 207, the an identifier may be included in the context transmitted to a context manager 209, 210, 211 in an neighboring access network allowing same to identify an mobile node 207 upon its attachment to the network and to make use of the context information for communication 511.

The invention claimed is:

1. A method for selection of an access network in a communication network comprising a plurality of heterogeneous access networks wherein a mobile terminal is attached to one of the plurality of heterogeneous access networks, the method comprising:
   receiving network status information at an access network information transfer manager, wherein the access network information transfer manager is common to the plurality of heterogeneous access networks in the communication network;
   receiving location information of the mobile terminal at the access network information transfer manager;
   determining by the access network information transfer manager at least one neighboring access network for the mobile terminal based on the received network status information and the received location information;
   generating by the access network information transfer manager at least one context for the at least one neighboring access network and the mobile terminal; and
   transmitting by the access network information transfer manager the at least one context to each of the at least one neighboring access network and the mobile terminal,
   receiving the at least one context at the mobile terminal,
   selecting by the mobile terminal the access network among the least one neighboring network based on the at least one context,
   wherein the generating of the at least one context is based on capabilities and parameters associated with the mobile terminal and capabilities and parameters of the at least one neighboring access network taking into account access technology, and
   wherein the access network information transfer manager common to the plurality of heterogeneous access networks performs a context transfer related to said mobile terminal.

2. The method according to claim 1, wherein the at least one context comprises a routing policy.

3. The method according to claim 1, wherein the network status information comprises at least one of reached Quality of Service in a network and failure of access to a network.

4. The method according to claim 1, wherein the network status information is received from a mobility manager.

5. The method according to claim 4, wherein at least parts of functions of the mobility manager are located at the mobile terminal.

6. The method according to claim 4, wherein at least parts of functions of the mobility manager are located in the communication network.

7. The method according to claim 1, wherein the access network information transfer manager contacts the communication network to investigate a network status.

8. The method according to claim 1, further comprising:
   preconfiguring by the mobile terminal its network interfaces for the next points of access based on the context.

9. The method according to claim 1, wherein the location information of the mobile terminal is based on a geographical location.

* * * * *